3,515,963
OUTLINE FOLLOWING APPARATUS
Brian Yoxall Moss, Thornton Heath, England, assignor to Morfax Limited, Mitcham, Surrey, England, a corporation
Continuation-in-part of application Ser. No. 594,768, Nov. 16, 1966. This application Sept. 29, 1967, Ser. No. 671,682
Claims priority, application Great Britain, Sept. 5, 1967, 40,465/67
Int. Cl. G05b *11/06*
U.S. Cl. 318—18    11 Claims

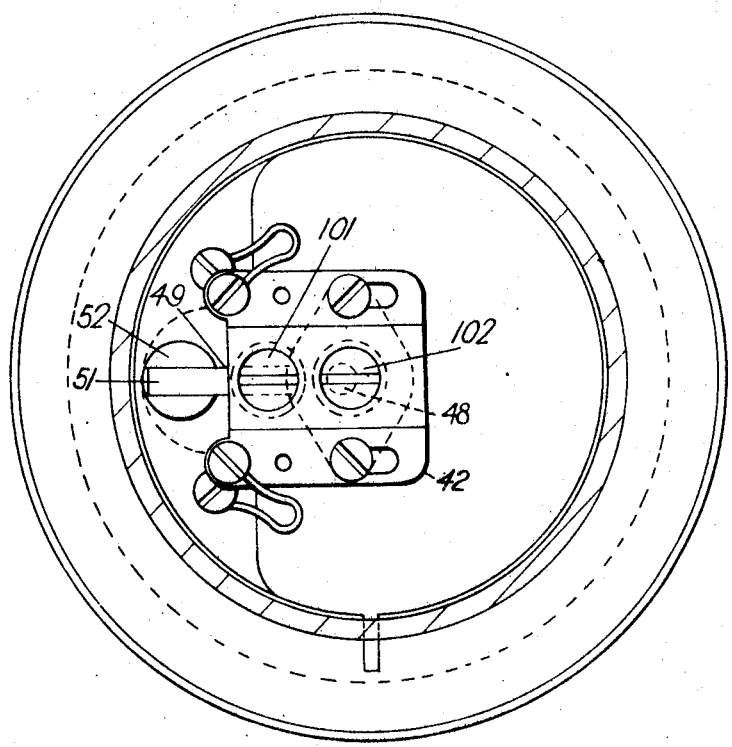

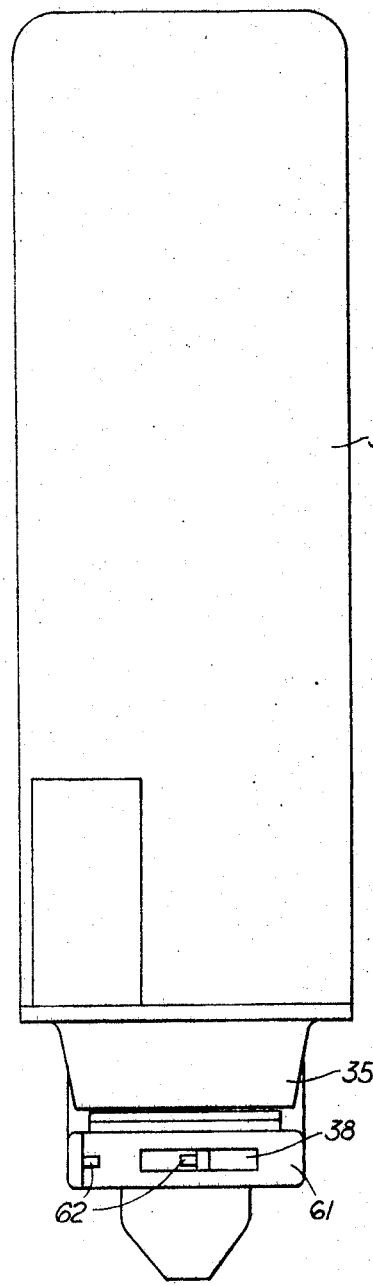

ABSTRACT OF THE DISCLOSURE

An outline following device for controlling machining operations directly or for producing recordings for machine tool control comprises a rotatable member forming part of a follower head assembly and incorporating at least one light-sensitive device driven with an oscillatory motion by a synchronous rotary motor and in which the rotatable member is steered by means of a servo motor operated responsively to signals derived from the light-sensitive device or devices so as to maintain a constant relation between the oscillatory motion of the light-sensitive device and the particular part of the outline being followed, such device further including means to impart a translatory co-ordinate motion to said head assembly responsively to the rotary position of said member so that the head assembly moves progressively along said outline and follows the configuration thereof.

---

Figure 1:
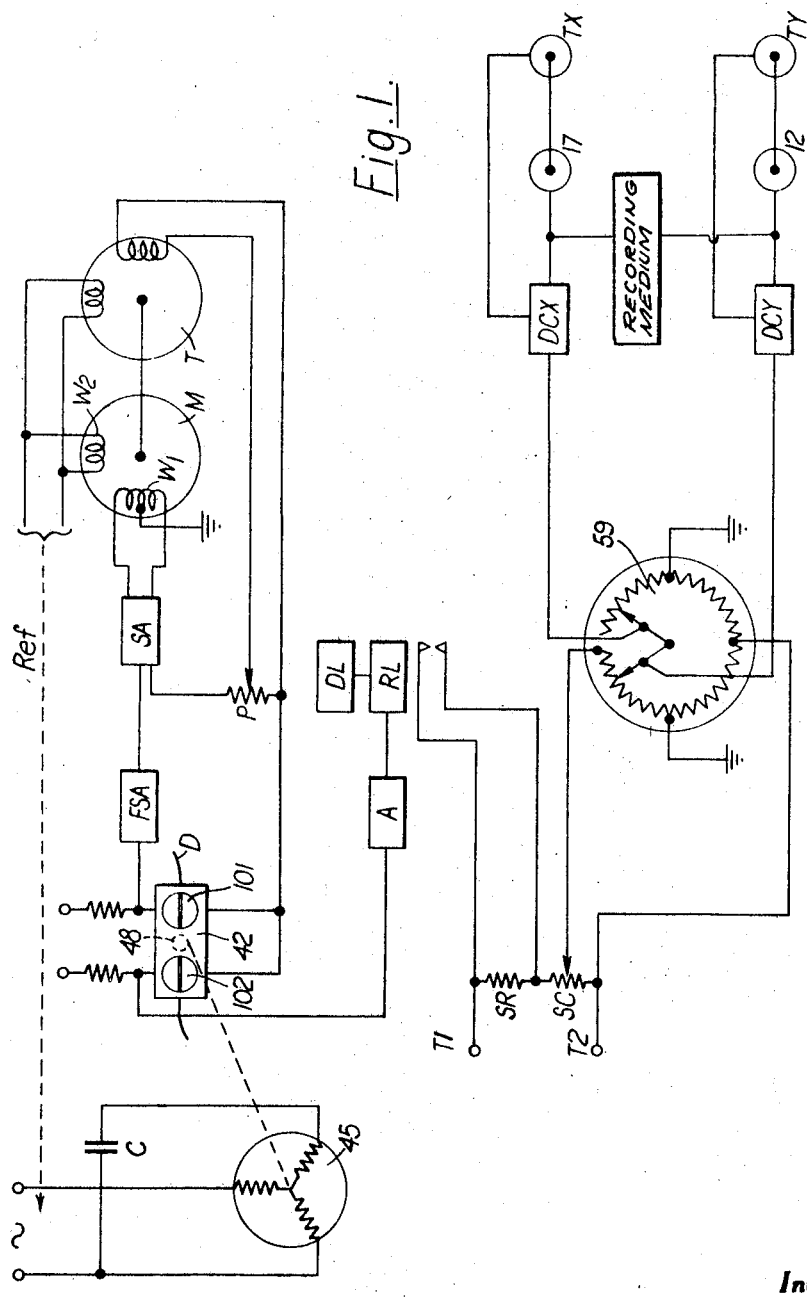

The present invention relates to outline following apparatus of the light-responsive type and intended for directly or indirectly controlling the operation of a machine performing an operation upon a workpiece by a cutter or similar means dependently upon a drawing, template or the like representing the shape of a component to be produced, and is a continuation-in-part of application Ser. No. 594,768 filed Nov. 16, 1966.

Such line-following devices have been proposed for various purposes heretofore but the constructions previously adopted are subject to certain disadvantages as regards accuracy and ability to control a machine tool, in which the cutting tool is subjected to substantial cutting pressure, and the object of the present invention is to provide an improved form of device of the character referred to and which can be readily adapted to allow for the known dimensions of a cutting or other manipulating tool involved to ensure that the machined outline is an exact reproduction of the drawing or pattern being followed.

The features of the present invention are applicable to a wide variety of machining operations based for example on chip removal machining processes, such as routing or milling, and it may also be used for channelling operations, while the features of the present invention are also applicable to flame cutting.

An important feature of the present invention, which is moreover applicable independently of the construction and operational features of the follower head described herein, is that the relevant data derived from a drawing or template is adapted to be recorded on some form of recording medium, for example a magnetic tape, so that such tape can be used for the control of the machining operation whenever required and in some cases of a machine tool located at a different point.

The present invention covers both the direct operative linkage of a line-following device of the character referred to with a machine tool capable of cutting or otherwise machining a workpiece, as well as the provision of recording means responsive to the movement of the line-follower head as it follows the outline of a drawing or template, to produce a record for example on magnetic tape, which may be utilised on a separate or remote machine for performing the machining operations at a later date.

A line-following device according to the invention comprises a follower head assembly mounted for movement relatively to an illuminated surface bearing an outline to be followed, a light-sensitive device mounted in a rotatable member in said follower head assembly and adapted to receive an image of said outline, a synchronous rotary motor operated from an alternating current supply to impart an oscillatory motion to said light-sensitive device relatively to said image, a servo motor adapted to steer or adjust the rotary position of said member in response to signals derived from said light-sensitive device to rotate said member to maintain a constant relation between the oscillatory motion of the light-sensitive device and the particular part of the outline being followed, and means to impart a translatory motion to said head assembly dependently on the rotary position of said member so that the head assembly moves progressively along said outline and follows the configuration thereof.

Preferably the light-sensitive device or a plurality of such devices is/are carried by an oscillator block engaged by an eccentric element driven by the synchronous rotary motor and an outwardly directed element on said oscillator block is constrained by engagement with the rotatable member of said follower head assembly which is steered or adjusted in response to signals derived from said light-sensitive device or devices.

Conveniently the outwardly directed element is an arm slidably engaging a forked member carried by the rotatable member, said forked member being itself rotatable about an axis parallel to the axis of the rotatable member.

The rotary position of the rotatable member is arranged to control the co-ordinate movement of the follower head assembly so that the latter accurately follows the outline being reproduced. The X- and Y-axis displacement is conveniently obtained by X- and Y-axis driving motors coupled by lead screws or in any other convenient manner to carriage members supporting the head. The X- and Y-axis driving motors may be driven through suitable D.C. amplifiers from control signals derived from a sine/cosine potentiometer actuated by the rotary displacement of the rotatable member.

Conveniently two independent light-sensitive devices are provided reciprocated together relatively to the line or outline being followed and one of said devices functions as a forward-seeking device capable of sensing any change in direction of the line or outline and adapted to produce a slow-down signal which retards the X- and Y-axis driving motors if a sudden change in direction of the line or outline is detected.

In one construction according to the invention the movement of the head is directly coupled to an adjacently positioned machine tool of suitable type so as to perform a cutting operation identical with the drawing line being followed; while in an alternative embodiment of the invention the X- and Y-axis signals are converted into data form suitable for recording on a recording medium, for example to produce pulse signals, which are recorded on one or more magnetic tapes. This tape or these tapes can thereafter be used for controlling a separately positioned machine tool.

Figure 2:
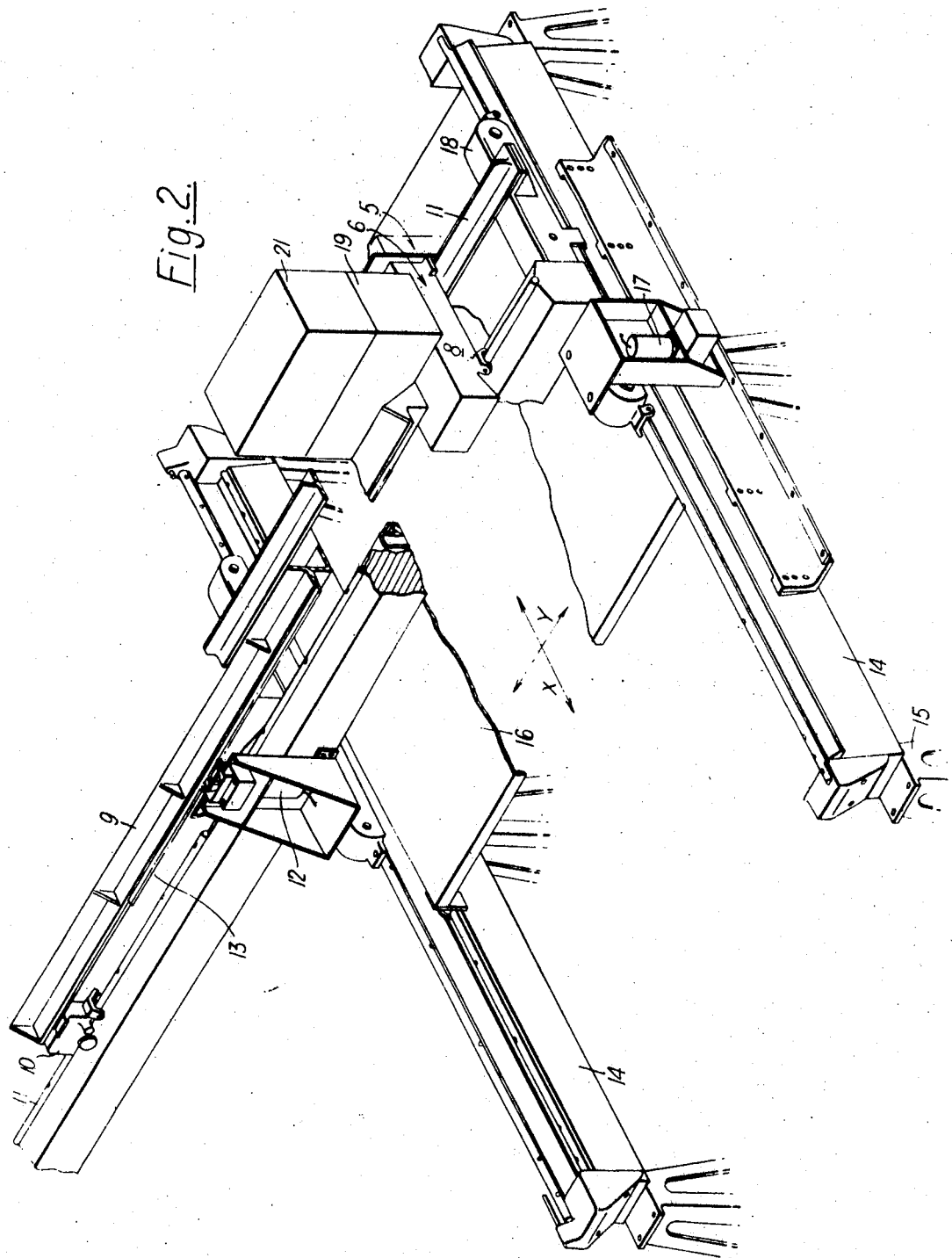
Figure 3:
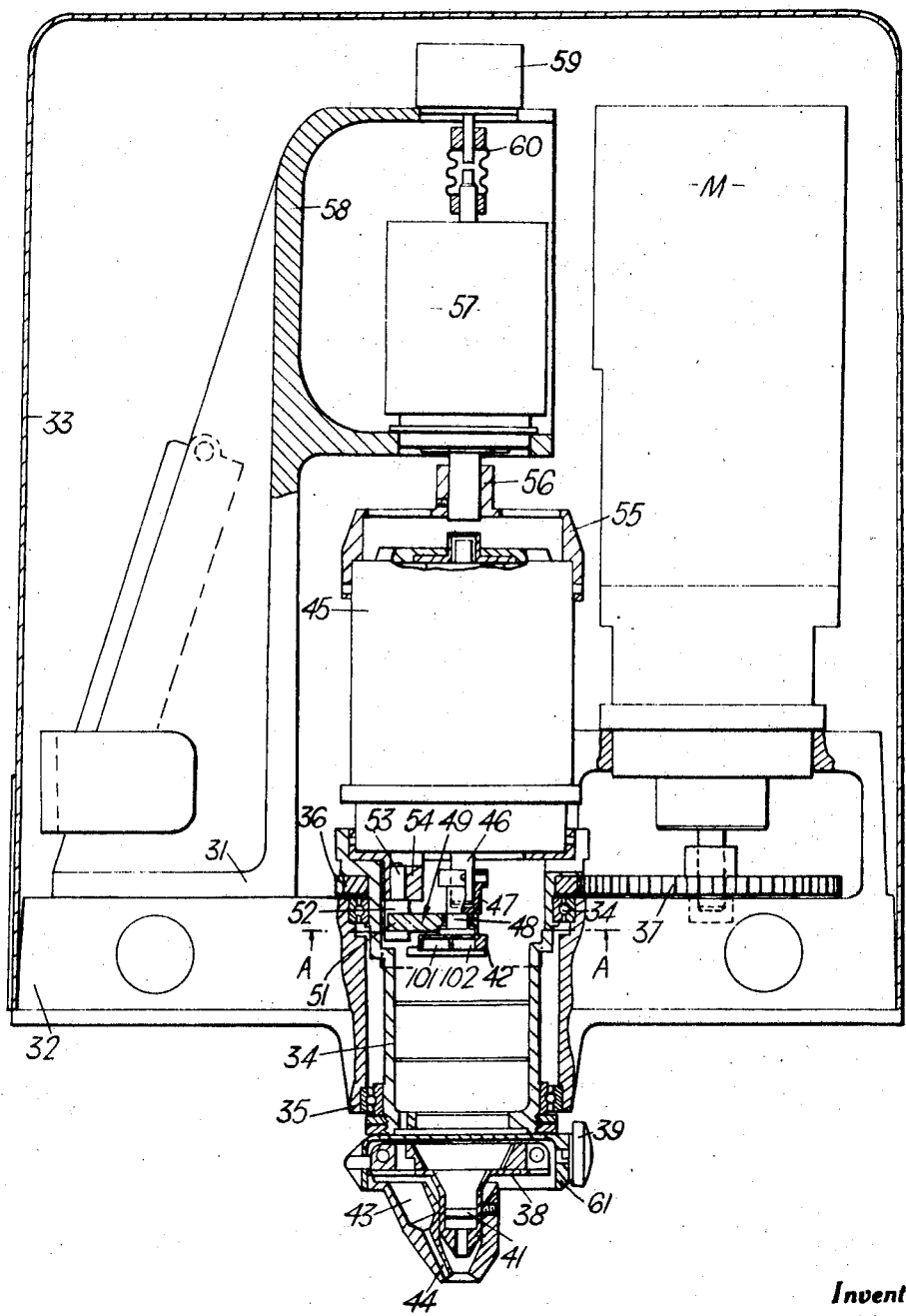

The features of one embodiment of the present invention are illustrated by way of example on the accompanying drawings in which:

FIG. 1 is a block circuit diagram illustrating the main features of the invention, FIG. 2 is a general view showing the carriage mounting permitting movement along the X- and Y-axes, FIG. 3 is a central section showing the follower head, FIG. 4 is a section on the line A—A of FIG. 3, and FIG. 5 is a side elevation of FIG. 3 as seen in a direction at right angles to FIG. 3.

Referring first to FIG. 2 of the drawings, the follower head shown in detail on FIGS. 3 to 5 of the drawings and indicated generally at 5 is supported on a carriage 6 for movement in two directions along the X- and Y-axes above a table 16 to receive a drawing or similar original to be reproduced. As shown the carriage 6 is supported by a runner 8 and includes a projecting arm 9 carrying a further runner 10. The runners 8 and 10 are supported on parallel rails 11 and are movable lengthwise on said rails in a direction which represents the Y-axis of a co-ordinate system by means of a Y-axis drive motor 12. The rotation of the Y-axis drive motor 12 is imparted to the arm 9 in any convenient way, for example by means of a lead screw or by means of a rack, indicated at 13 on the drawings.

The parallel rails 11 also form the X-axis main carriage and run on parallel support rails 14 suitably supported on fixed carriers 15 with the table surface 16 located between them to carry a template or drawing to be followed by the line follower head 5.

An X-axis driving motor 17 operates a lead screw or a suitable rack, not shown, associated with a carriage member 18 running on one of the rails 14 and serving as supports for the ends of the rails 11.

Box-like housings are shown at 19 and 21 for housing a control unit and the associated power amplifiers required for regulating the operation of the X- and Y-axis driving motors 17 and 12. Thus it will be seen that the follower head 5 is supported by a carriage movable on X- and Y-axis guide rails for universal movement in a plane parallel to the plane of a drawing outline or template to be followed. The movements in the two directions are obtained from motors 12, 17 each with tachometer generator feed back speed control, the control signals for the motors being taken from amplifiers operated from a sine/cosine potentiometer hereinafter referred to. The construction of the follower head is shown in FIGS. 3 to 5 in which a main body member 31 is bolted to a base 32 supporting a metal or plastics cover 33.

A central bore in the base 32 supports a rotatable member or tube 34 by means of ball bearings 35 and a toothed ring 36 on the tube 34 is engaged with a gear wheel 37 operated by a servo motor M supported by the base 32 parallel to the vertical axis of the member 34. At the lower end the member 34 incorporates an adjustable cross slide assembly 38 adapted to be fixed after adjustment by means of a knurled knob 39.

The slide carries an optical lens system 41 by which an image of a drawing outline D (FIG. 1) being followed is projected on to two light-sensitive devices, such as light-dependent resistors 101, 102 carried by an oscillatory mount 42. The lower part of the slide 38 provides a mounting for one or more pilot light sources located within a housing portion 43 and adapted to project a marker pencil of light through an opening or window 44 which assists in bringing the follower head into position over the outline to be followed. The outline is suitably illuminated by adjacently positioned light sources, not shown, which may be energised by direct current. Alternating current lighting may also be used, in which appropriate changes may be required in the circuits operated by the light-sensitive devices for driving the servo motor M. Electric connections are made to various electrical components carried by the member 34 by means of a suitable slip ring unit 57 which may be a commercially available unit.

The upper end of the member 34 is enlarged as indicated to receive a rotary driving motor 45 the driven shaft 46 of which carries a bushing 47 having an eccentric driving pin 48. The driving motor 45 is a synchronous rotary motor operated from an alternating current line supply for the equipment in which case a three phase motor is preferably used, the third phase being obtained by a phasing capacitor C, indicated on FIG. 3 of the drawing in well-known manner for operation from a single phase supply.

The pin 48 is engaged in a ball bearing rotatable in an aperture in an oscillator block 49 the lower face of which carries the mount 42 for the light-sensitive devices 101 and 102 neither of which is coincident with the aperture in the block 49. The latter is provided with a radially disposed arm 51 which is constrained by being engaged in the forked bottom part 52 of a spindle 53 rotatable in a bore in a lug 54 projecting inwardly of the bore within the member 34.

It will be seen that when the driving motor 45 is in operation the aperture in the oscillator block is rotated in a circular path about the main vertical axis of the motor 45 while the projecting arm 51 of the oscillator block 49, being accommodated in the forked end part 52 of the spindle 53, moves in a linear reciprocatory manner.

Referring to FIGS. 3 and 4 it will be seen that the light-sensitive device 102 lies on the opposite side of the pin 48 to the arm 51 and it will thus execute an approximately elliptical movement with its major axis transverse to the length of the image of the outline, which extends in the same direction as the arm 51 under normal operating conditions. This device 102 serves as a forward-seeking cell which detects approaching changes in direction of the outline. The light-sensitive device 101 is the main follower cell and, being nearer the arm, executes a substantially elliptical movement—or more correctly an oval movement—with the major axis along the image of the outline D.

The casing of the motor 45 rotates with the carrier tube 34 and the upper end of said motor is engaged within and fixed to a cup member 55 to which is attached an upwardly projecting shaft 56 connected to the slip ring unit 57. The upper end of the shaft 56 is connected through a bellows coupling 60 to a sine/cosine potentiometer 59 mounted in the upper part of a bracket member 58 standing upwardly from the base 32.

FIG. 1 is a block diagram illustrating the operating principles of the present invention. The outline D being followed is for example a drawing mounted on the table 16 and is illuminated by one or more light sources. A magnified image of the outline being followed is formed in a plane containing the one or more light-dependent resistors 101, 102 and the holder 42 is oscillated in an elliptical path as described above by means of the rotary synchronous motor 45 and the eccentric driving pin 48.

This movement of the light-dependent resistor or resistors produces a signal output which includes a phase conscious component at twice the oscillation frequency because the outline D is crossed twice in each cycle by the light-sensitive device or devices. As indicated, two light-sensitive devices 101, 102 are shown, the device 101 serving as a main follower cell, whereas the device 102 serves mainly as a forward-seeking cell to determine approaching sudden changes in direction in the outline D. The output signal from the main follower cell 101 is applied to an amplifier FSA which embodies filter circuits adapted to reject components at twice the oscillation frequency. The resulting signal varies in phase depending on the angular disposition of the outline D relatively to the oscillatory movement of the holder 42 and is fed to a servo amplifier SA feeding a main winding $W_1$ of the servo motor M. A further winding $W_2$ receives a reference frequency from the line supply. The motor M is thereby caused to rotate in one direction or the other, thereby steering the rotatable member 34 and the associated parts, in one direction or the other according to the path of the outline being followed. When the outline D is centrally positioned in relation to the oscillatory movement of the holder 42 the windings $W_1$ and $W_2$ produce no torque so that the servo motor M is stationary. As the follower head approaches a deviating section of the outline D the current in the winding $W_1$ varies in phase so that the motor M exerts a torque in one direction or the other which results in a steering motion being imparted to the rotatable member 34 such that it is steered so as still to follow the outline and so that the linear movement of the arm 51 is centred on the outline.

The change in the rotary position of the member 34 actuates the sine/cosine potentiometer 59 to vary the operation of the motors 17 and 12 in such manner that the follower head also follows the changing drawing outline D. The amplifier SA also receives from the potentiometer resistor P an adjustable feed back sensitivity signal from a tachometer generator T driven by the servo motor M and which also receives the reference frequency.

The forward seeking light-sensitive device 102 feeds an amplifier A in turn operating a relay RL associated with a delay circuit DL which delays the operation of the relay RL a contact $RL_1$ of which provides a slow-down control in association with the circuits driving the X- and Y-axis co-ordinate motors, as explained below. The result is that when the forward-seeking light-sensitive device 102 senses a substantial change in direction in the outline, the relay RL, which is energised in normal operation, is released and the speed of the co-ordinate motors is reduced. The re-closing of the relay is delayed sufficiently by the delay device DL to ensure smooth and correct operation.

Referring now to the operating circuit for the X- and Y-axis driving motors, shown on FIG. 1 at 17 and 12, it will be seen that the sine/cosine potentiometer 59 is energised from a floating stabilised reference voltage supply at terminals $T_1$ and $T_2$. A slow-down resistor SR and a speed control potentiometer SC are connected in series across the terminals $T_1$ and $T_2$ the resistor SR being in turn shunted by the relay contact $RL_1$. A variable voltage from the speed control resistor SC is fed to opposed inputs of the potentiometer 59 while points at right angles thereto are earthed as indicated. The two moving elements of the sine/cosine potentiometer 59 disposed at right angles one to the other are connected to D.C. amplifiers DCX and DCY feeding the two co-ordinate driving motors 17 and 12. Each of these motors is associated with a tachometer generator TX and TY respectively which provide a feed back signal to the amplifiers DCX and DCY.

In use the follower head 5 is brought into position over the outline D to be followed with the assistance of the marker light spot projected through the window 44. Then the apparatus is set into operation and the signal developed across the light-sensitive device 101 provides a drive for the motor M which causes the rotatable member of the follower head to become positioned so that the oscillator block is arranged with the arm 51 executing an oscillatory movement centred about the outline.

As the follower head moves progressively along the outline D the servo motor M steers the rotatable member 34 so that the oscillatory movement remains centered upon the outline and simultaneously the X- and Y-axis motors 17 and 12 are operated in appropriate speeds and directions to ensure that the follower head 5 as a whole progresses steadily and smoothly along the outline. This steering movement of the rotatable member 34 provides this effect by operating the sine/cosine potentiometer 59 so that the co-ordinate motors 17 and 12 cause the follower head to traverse and follow the outline, and such movement may be communicated directly to a cutting tool or may be recorded for example on magnetic tape.

The speed of operation of the motors 17 and 12 is dependent on the setting of the speed control potentiometer SC and under normal conditions the slow-down resistor SR is short-circuited by the relay contact $RL_1$. If there is a sudden change in direction in the outline this change is sensed by the light-sensitive device 102 to operate the relay RL which releases that relay and the slow-down resistor SR becomes effective to reduce the speed of the motors 17 and 12 so that the follower head moves somewhat more slowly as the sudden change in direction is encountered and traversed.

The cross slide 38 is supported in a carrier 6 at the base of the rotatable member 34 and may be adjusted and fixed by the knob 39 to provide for horizontal adjustment of the optical system 41 to enable the latter to be selectively offset relatively to the axis of the rotatable member 34. This permits the follower head 5 as a whole to be offset by an amount corresponding to the dimensions of a cutter to be controlled by the following equipment and according to the radius of said cutter. To assist adjustment sensing pins 62 (see FIG. 5) are provided on the slide 38 and on the carrier 61 to permit accurate setting by means of a gauge block of known size. The required gauge block may be selected by means of a chart relating the required offsetting to the size of a cutter to be used. Alternatively a scale and a vernier device may be provided. These procedures permit the equipment to be adjusted so that the machining operation effected by the cutter is such that the machined workpiece is identical in shape and size to the outline being followed.

The head 5 may be directly linked to a metal cutting tool as already indicated or the co-ordinate movements of the head 5, as taken from the signals derived from the two outputs of potentiometer 59, may be recorded on any suitable recording medium (shown schematically in FIG. 1), for example magnetic tape, and the tape record used on a separate machine for controlling the co-ordinate movements of the cutting tool. Furthermore the response of the follower head 5 when caused to follow an outline or template may be used to produce pulse signals which may be recorded on one or more magnetic tapes, and conveniently these records are in the form of cartesian co-ordinates such as are obtained from the sine/cosine potentiometer 59. Preferably however the shafts of the X- and Y-axis motors carry impulsing wheels adapted to produce digital signals, for example by photo-electric scanning methods, and these signals are recorded on magnetic tape which can thereafter be used for actuating or controlling the X- and Y-motors on a separately located machine tool of the appropriate type.

What I claim is:

1. An outline following apparatus wherein a follower head is mounted over a surface bearing an outline to be traced and including a rotatable member supporting a first light-sensitive device responding to said outline, cyclically movable means for producing modulated signals from said light-sensitive device to control the rotation of said member in accordance with the position of said outline relative to the cyclic movement of said member, the signals causing said follower head to continuously follow the outline, means for displacing said follower head in accordance with the controlled rotation of said member, optical means in said rotatable member for projecting an image of said outline directly onto said light-sensitive device, means responsive to the modulated signal output from said light-sensitive device for controlling the rotation of said member and for actuating the means for displacing the follower head to follow the outline, said light-sensitive device being carried by an oscillatory mount, the improvement essentially consisting of means for driving said cyclically movable means to produce a constant cyclic amplitude movement thereof and to provide a controlled transverse movement of said light-sensitive device to said projected outline image, said drive means including linear guide means constaining said mount at one point thereon and further including a synchronous rotary electric driving motor eccentrically engaged with said mount at another point thereon for transmitting oscillatory motion to said mount and said light-sensitive device as said motor is rotatably driven.

2. An outline following apparatus according to claim 1 wherein said mount includes an oscillator block having an outwardly extending member linearly guided in said rotatable member by said guide means and rotatably driven by said motor at a point centrally of said rotatable member, said motor including an output shaft, said output shaft including an eccentric pin for eccentrically engaging said motor with said mount, and said light-sensitive device being carried by said mount non-coincidently with said pin to execute an elliptical movement path relative to said image of said outline.

3. An outline following apparatus according to claim 2 wherein said guide means comprises a forked member carried by said rotatable member, said outwardly extending member slidably engaging said forked member which is itself rotatably mounted about an axis parallel to the axis of said rotatable member.

4. An outline following device according to claim 2 wherein said oscillator block is provided with an aperture engaged by said eccentric pin on the end of said synchronous rotary motor shaft.

5. An outline following apparatus according to claim 1 further comprising a second independently operated light-sensitive device carried by said mount, said second light-sensitive device receiving reflections of the outline image in advance of said first light-sensitive device, and means operated by said first light-sensitive device for controlling the operating speed of said follower head displacing means around the outline in response to a sensing of a change in direction of the outline by said second light-sensitive device.

6. An outline following device according to claim 5, wherein the output of said first light-sensitive device is applied to an amplifier adapted to reject the frequency component of twice the oscillation frequency, such amplifier driving a servo amplifier operating said control means, thereby to cause rotation of the latter in one direction or the other required to maintain the oscillatory motion of the oscillator block centered upon the outline being followed.

7. An outline following device according to claim 1, wherein the output of said light-sensitive device is applied to an amplifier adapted to reject the frequency component of twice the oscillation frequency, such amplifier driving a servo amplifier operating said control means, thereby to cause rotation of the latter in one direction or the other required to maintain the oscillatory motion of the light-sensitive device centered upon the outline being followed.

8. An outline following device according to claim 1, wherein the rotatable member is operatively coupled to a device for providing co-ordinate signals dependently on the rotary position of said rotatable member, such co-ordinate signals being utilised for driving amplifiers in turn operating X- and Y-axis driving motors for the translatory motion of said follower head.

9. An outline following device according to claim 8, wherein said device for forming co-ordinate signals consists of a sine/cosine potentiometer the two outputs of which are connected to D.C. X- and Y-amplifiers in turn operating said X- and Y-axis driving motors.

10. An outline following device according to claim 8, wherein said device for providing co-ordinate signals consists of a sine/cosine potentiometer the two outputs of which are connected to D.C. X- and Y-amplifiers in turn operating said X- and Y-axis driving motors, and speed control means for said X- and Y-axis driving motors, and speed control means for said X- and Y-axis motors consisting of a potentiometer in a network further including a slow-down resistor and in which said resistor is normally short-circuited by on-normal contacts of a relay energised by a forward-seeking light-sensitive device which provides a control output as said follower head approaches a sudden change in direction in the outline to actuate said relay and to bring said slow-down resistor in circuit in said network to reduce the speed of said X- and Y-axis driving motors.

11. An outline following device according to claim 9, wherein the signals derived from the two outputs of the sine/cosine potentiometers are recorded on a recording medium for subsequent use on a machine tool.

References Cited
UNITED STATES PATENTS

| | | | |
|---|---|---|---|
| Re. 25,581 | 5/1964 | Cheverton et al. | 318—162 XR |
| 3,286,142 | 11/1966 | Redman | 318—18 |
| 3,352,263 | 11/1967 | Adams et al. | 318—162 XR |
| 3,389,312 | 6/1968 | Redman | 318—19 |
| 3,395,281 | 7/1968 | Roen et al. | 318—18 XR |

BENJAMIN DOBECK, Primary Examiner

U.S. Cl. X.R.

318—28